US00RE41855E

(19) United States
(12) Reissued Patent
Ruvang et al.

(10) Patent Number: US RE41,855 E
(45) Date of Reissued Patent: Oct. 26, 2010

(54) CONNECTOR PIN ASSEMBLY AND ASSOCIATED APPARATUS

(75) Inventors: John A. Ruvang, Bartonville, TX (US); Howard W. Robinson, Grapevine, TX (US)

(73) Assignee: Hensley Industries, Inc., Dallas, TX (US)

(21) Appl. No.: 12/150,099

(22) Filed: Apr. 23, 2008

Related U.S. Patent Documents

Reissue of:
(64) Patent No.: 7,162,818
Issued: Jan. 16, 2007
Appl. No.: 10/634,514
Filed: Aug. 4, 2003

(51) Int. Cl.
*E02F 9/28* (2006.01)

(52) U.S. Cl. ..... 37/456; 37/457; 37/452
(58) Field of Classification Search ..... None
See application file for complete search history.

(56) References Cited

U.S. PATENT DOCUMENTS 2,618,873 A * 11/1952 Hostetter ..... 37/459
2,798,403 A * 7/1957 Launder ..... 85/8.3
2,859,651 A * 11/1958 Horovitz ..... 85/5
3,019,537 A * 2/1962 Stephenson ..... 37/142
3,511,126 A * 5/1970 Watts ..... 85/8.3
3,526,435 A * 9/1970 Krekeler ..... 299/92
3,751,834 A * 8/1973 Petersen ..... 37/458
3,997,989 A * 12/1976 Stepe ..... 37/142 A
4,067,657 A * 1/1978 Kaarlela ..... 403/317
4,096,653 A * 6/1978 Kaarlela et al. ..... 37/142 A
4,324,057 A * 4/1982 White ..... 37/142 A
4,848,013 A * 7/1989 Bowman et al. ..... 37/457
4,918,843 A * 4/1990 Kiesewetter et al. ..... 37/142 A
5,077,918 A * 1/1992 Garman ..... 37/141 T
5,152,088 A * 10/1992 Hahn ..... 37/142 A
5,491,915 A * 2/1996 Robinson ..... 37/458
5,564,206 A * 10/1996 Ruvang ..... 37/458
5,591,083 A * 1/1997 Kirschey ..... 464/83
5,709,043 A * 1/1998 Jones et al. ..... 37/458
5,718,070 A * 2/1998 Ruvang ..... 37/459
5,765,301 A * 6/1998 Clendenning ..... 37/457
5,913,605 A * 6/1999 Jusselin et al. ..... 37/451
5,937,550 A * 8/1999 Emrich ..... 37/458
5,983,534 A * 11/1999 Robinson et al. ..... 37/459
5,992,063 A * 11/1999 Mack ..... 37/450
6,079,132 A * 6/2000 Clendenning ..... 37/457
6,092,958 A * 7/2000 Gale ..... 403/378
6,102,610 A * 8/2000 Palusis et al. ..... 403/388
6,108,950 A * 8/2000 Ruvang et al. ..... 37/452
6,125,559 A * 10/2000 Mullenhour ..... 37/232
6,219,943 B1 * 4/2001 Kitchell ..... 37/232
6,354,025 B1 * 3/2002 Kirchell ..... 37/232
6,467,203 B2 * 10/2002 Pippins ..... 37/452
6,502,336 B2 * 1/2003 Pippins ..... 37/458
6,536,141 B2 * 3/2003 Kitchell ..... 37/232
6,708,431 B2 * 3/2004 Robinson et al. ..... 37/456
6,757,995 B2 * 7/2004 Pippins ..... 37/468
6,799,387 B2 * 10/2004 Pippins ..... 37/456

(Continued)

*Primary Examiner*—Thomas A Beach
(74) *Attorney, Agent, or Firm*—Haynes and Boone, LLP

(57) ABSTRACT

Telescoped excavating support and wear members are releasably retained in their telescoped relationship by a connector pin assembly removably received in aligned connector openings in the members. A body portion of the pin assembly blocks removal of the wear member from the support member, and a lock member portion of the assembly is rotatable relative to the body, toward and away from a locking orientation, to releasably lock the body within the connector openings. A resilient detent member carried by the lock member slidingly and deformably engages a polygonally shaped interior side surface section of a body passage that rotatably receives the lock member, the detent member yieldingly resisting rotational movement of the lock member away from its locking orientation.

36 Claims, 4 Drawing Sheets

U.S. PATENT DOCUMENTS 6,826,855 B2 * 12/2004 Ruvang ..... 37/450
7,178,274 B2 * 2/2007 Emrich ..... 37/453
7,195,307 B2 * 3/2007 Tucker et al. ..... 296/190.05
2003/0070330 A1 * 4/2003 Olds et al.
2003/0101627 A1 * 6/2003 Robinson et al.
2004/0237354 A1 * 12/2004 Emrich ..... 37/450
2007/0261278 A1 * 11/2007 Campomanes ..... 37/452
2008/0209772 A1 * 9/2008 Cui ..... 37/456

* cited by examiner

CONNECTOR PIN ASSEMBLY AND ASSOCIATED APPARATUS

Matter enclosed in heavy brackets [ ] appears in the original patent but forms no part of this reissue specification; matter printed in italics indicates the additions made by reissue.

BACKGROUND OF THE INVENTION

The present invention generally relates to material displacement apparatus such as excavating equipment and, in illustrated embodiments thereof, more particularly relates to apparatus for releasably coupling a replaceable excavating tooth point or other wear member to an associated adapter nose structure.

A variety of types of material displacement apparatus, such as excavating equipment, are provided with replaceable wear portions that are removably carried by larger base structures and come into abrasive, wearing contact with the material being displaced. For example, excavating tooth assemblies provided on digging equipment such as excavating buckets or the like typically comprise a relatively massive adapter portion which is suitably anchored to the forward bucket lip and has a reduced cross-section, forwardly projecting nose portion, and a replaceable tooth point having formed through a rear end thereof a pocket opening that releasably receives the adapter nose. To captively retain the point on the adapter nose, generally aligned transverse openings are formed through these telescoped elements adjacent the rear end of the point, and a suitable connector structure is driven into and forcibly retained within the aligned openings to releasably anchor the replaceable tooth point on its associated adapter nose portion.

The connector structure typically has to be forcibly driven into the aligned tooth point and adapter nose openings using, for example, a sledge hammer. Subsequently, the inserted connector structure has to be forcibly pounded out of the point and nose openings to permit the worn point to be removed from the adapter nose and replaced. This conventional need to pound in and later pound out the connector structure can easily give rise to a safety hazard for the installing and removing personnel.

Various alternatives to pound-in connector structures have been previously proposed for use in releasably retaining a replaceable wear member, such as a tooth point, on a support structure such as an adapter nose. While these alternative connector structures desirably eliminate the need to pound a connector structure into and out of an adapter nose they typically present various other types of problems, limitations and disadvantages including, but not limited to, complexity of construction and use, undesirably high cost, difficult installation and removal and unintentional operational dislodgment of the installed connector structure from its associated tooth point and support structure.

A need accordingly exists for an improved wear member/support member connector structure. It is to this need that the present invention is directed.

SUMMARY OF THE INVENTION

In carrying out principles of the present invention, in accordance with representative embodiments thereof, first and second members, illustratively an excavating adapter and associated tooth point, are captives retained in a telescoped relationship by a specially designed connector pin assembly embodying principles of the present invention. The connector pin assembly basically includes a body, a lock member and a resilient detent structure.

The body is removably received in aligned connector openings in the telescoped first and second members and blocks separation thereof from one another, the body having a passage extending inwardly through an outer surface thereof, the passage having a noncircularly shaped side surface section. Preferably, this noncircularly shaped side surface section has a polygonal shape which is representatively square. In a representatively illustrated version thereof, the body has an elongated flat shape with an exterior surface that extends between opposite end portions of the body, outwardly circumscribes its passage, and is substantially parallel to the length of the body.

The lock member is received in the body passage and is circumscribed by its noncircular side section, the lock member being rotatable relative to the body between a locking position in which a portion of the lock member, representatively a transverse lobe on an outer end portion thereof, blocks removal of the body from the aligned connector openings, and an unlocking position in which the lock member permits removal of the body from the aligned connector openings. The resilient detent member is carried by the lock member for rotation therewith, and is operative to releasably retain the lock member in its locking position.

In a first representative embodiment of the connector pin assembly, the resilient detent member has a periphery circumscribing the lock member and complementarily and slidably engaging the noncircularly shaped side surface section of the body passage. The lock member is captively retained within the body passage by a snap ring member carried by the lock member and received in a corresponding groove in the surface of the body passage.

In a second representative embodiment of the connector pin assembly, the lock member has a slot extending therethrough and opening outwardly through opposite outer side portions thereof. The resilient detent member extends through the slot and has opposite end portions projecting outwardly beyond these outer side portions and slidably engaging the noncircularly shaped side surface section of the body passage. The lock member is captively retained within the body passage by an annular bushing circumscribing the lock member and press-fitted into the body passage. An O-ring seal on the lock member slidingly and sealingly engages a circular interior side surface portion of the bushing.

DETAILED DESCRIPTION

Figure 1:
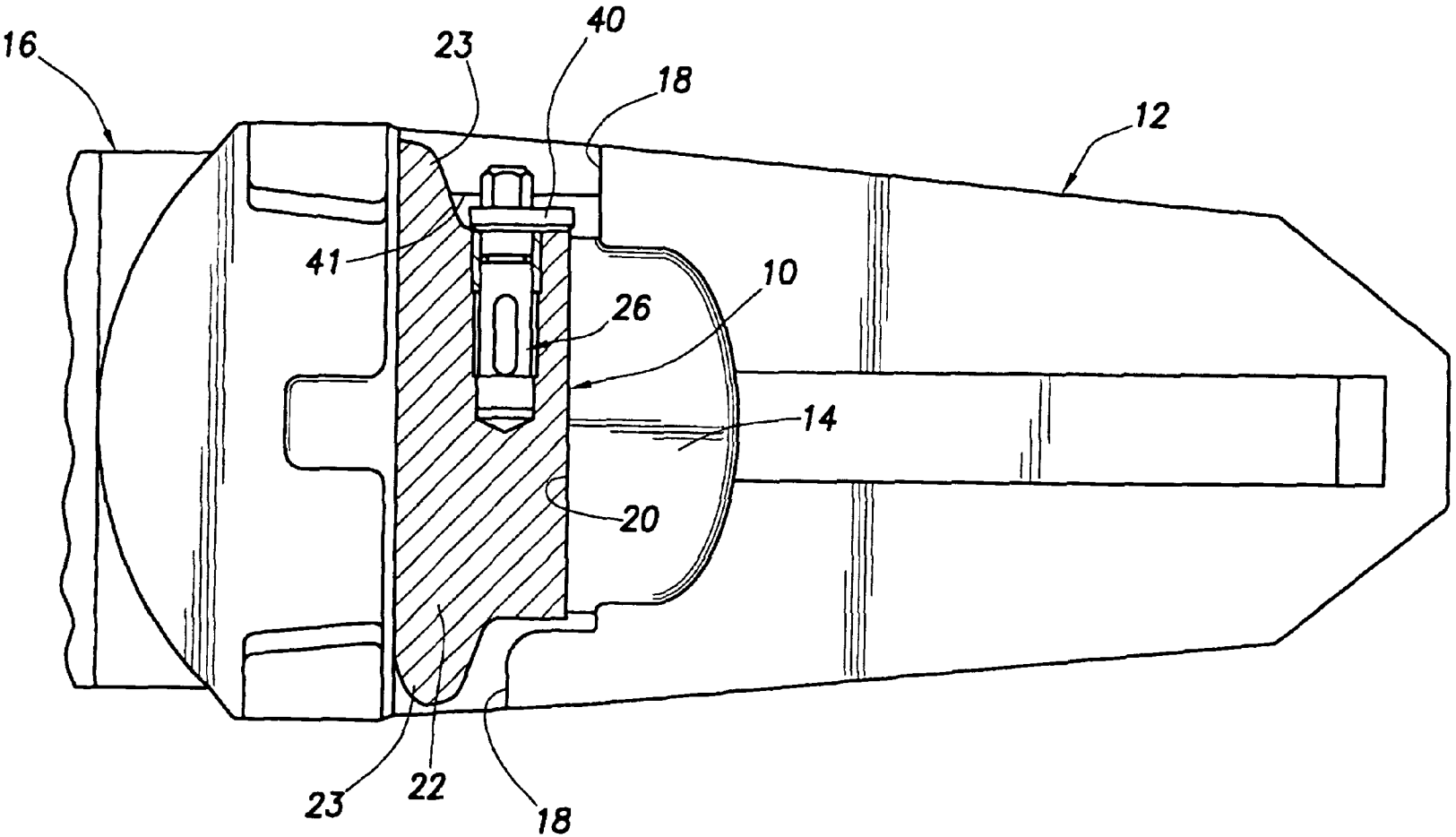
FIG. 1 is a longitudinally foreshortened, partially cut away side elevational view of a replaceable excavating tooth point telescoped onto a nose portion of an adapter structure and releasably retained thereon by a specially designed connector pin assembly embodying principles of the present invention.
Figure 2:
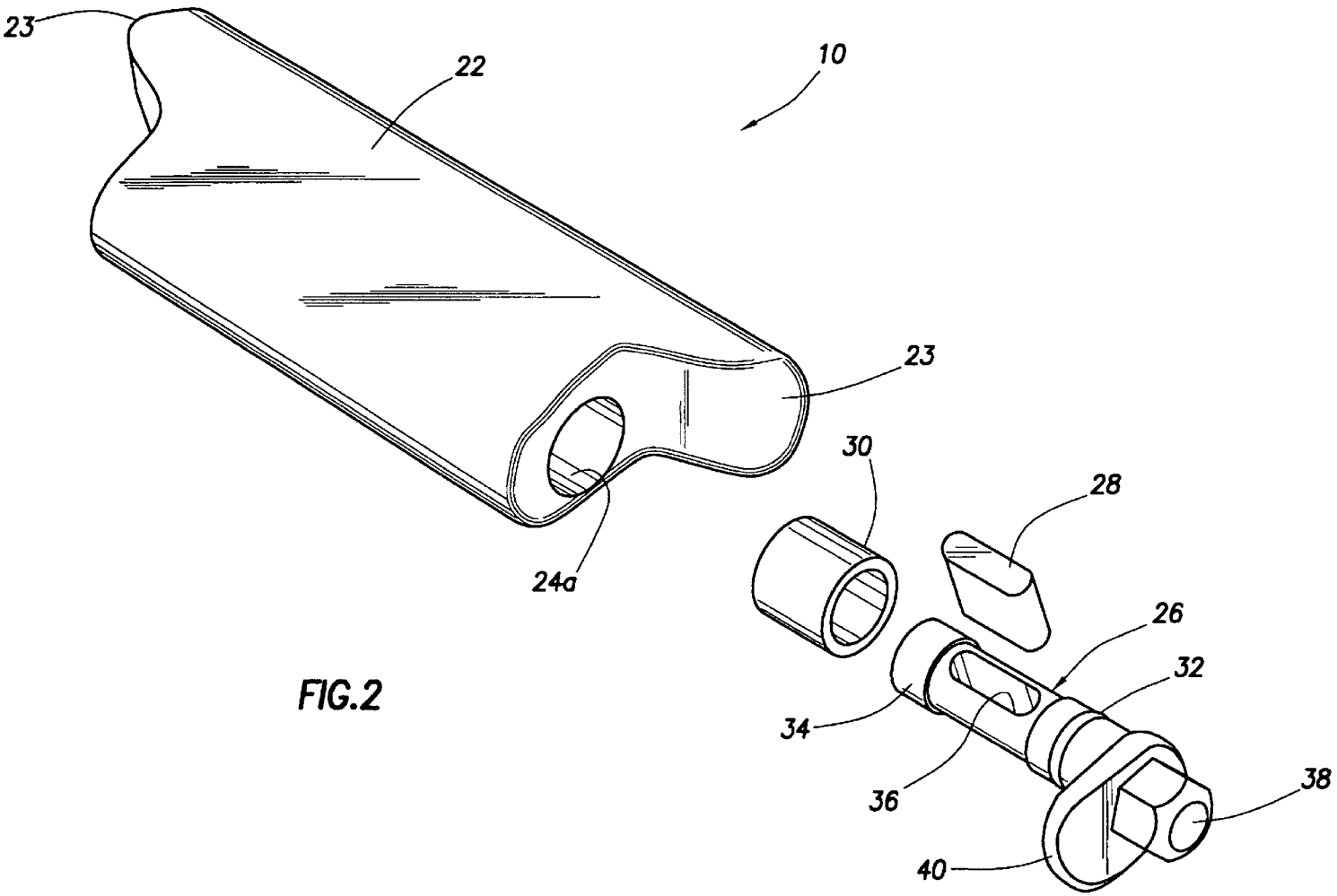
FIG. 2 is an enlarged scale exploded perspective view of the connector pin assembly.

AS illustrated in FIGS. 1–7, this invention provides a specially designed connector pin assembly 10 which is used to releasably interconnect two telescoped members such as the illustrated excavating tooth point 12 (or other wear member) which is telescoped onto the nose portion 14 of an associated adapter structure 16 (or other support structure). The connector assembly 10 is passed inwardly through aligned connector openings 18,20 respectively formed in the tooth point 12 and the adapter nose 14 and locked therein to block outward removal of the point 12 from the adapter nose 14. For a more detailed description of this general type of excavating equipment connector pin structure, see U.S. Pat. No. 6,108,950 which is assigned to the assignee of the present application and is hereby incorporated herein by reference.

In addition to its applicability to material displacement and excavating equipment, the connector pin assembly 10 may also be advantageously utilized in joining a wide variety of other types of telescoped members. Accordingly, it is to be clearly understood that principles of the present invention are in no way limited to the fields of material displacement and excavation equipment although such inventive principles are particularly well suited to such fields.

Connector pin assembly 10 includes an elongated metal main body portion 22 having an opening or passage 24 longitudinally extending inwardly through one end thereof, and opposite, longitudinally outwardly projecting end portions 23 that, as shown in FIG. 1, block removal of the point 12 from the adapter nose 14. Representatively, but not by way of limitation, the entire exterior periphery of the main body portion 22 is parallel to its length (i.e., the main body portion 22 does not appreciably taper laterally inwardly along its length) in a manner similar to that of the flat connector member 60 illustrated and described in copending U.S. application Ser. No. 10/287,406 assigned to the assignee of the present application and which is hereby incorporated herein by reference.

Opening or passage 24 has a circularly cross-sectioned longitudinally outer portion 24a (see FIG. 2), a square cross-sectioned longitudinally intermediate portion 24b (see FIGS. 3 and 7), and a smaller diameter longitudinally inner circularly cross-sectioned portion 24c (see FIG. 3) inwardly tangential to the square cross-sectioned opening portion 24b. Outer opening portion 24a is outwardly tangential to the opening portion 24b (i.e., tangential to its corner portions).

Still referring to FIGS. 1–7, connector pin assembly 10 also includes a rotatable metal lock member 26, an elongated rectangular detent member 28 formed from a resilient plastic or nylon material, an annular metal bushing 30, and a resilient O-ring seal member 32. The lock member 26 has an elongated cylindrical body 34 with a rectangularly cross-sectioned slot 36 transversely extending through a longitudinally intermediate portion thereof and sized to complementarily receive the detent member 28 with opposite end portions thereof projecting outwardly from opposite outer side surface portions of the body 34. At the outer end of the body 34 is a hexagonal driving head 38 from which a retaining lobe 40 outwardly projects.

Figure 4:
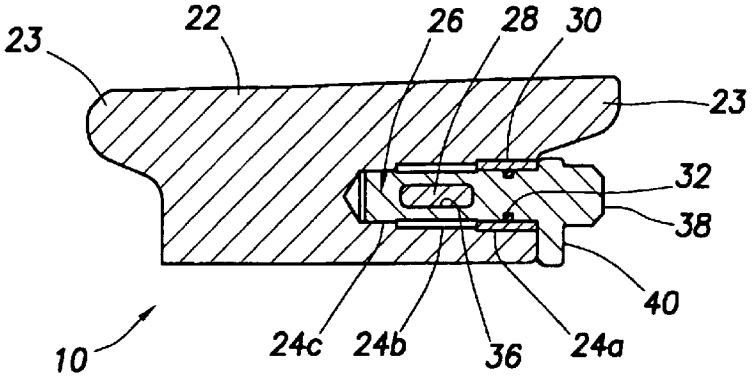
FIG. 4 is laterally directed cross-sectional view through the connector pin assembly.

The connector pin structure 10 is assembled by first placing the O-ring 32 in an associated annular groove on the body 34 between the lobe 40 and the transverse slot 36, and then placing the metal bushing 30 on the body 34 over the O-ring 32 (see FIG. 4). The resilient detent member 28 is then inserted into the slot 36 and the lock member body 34 is driven into the opening 24 in the main body portion 22 to press fit the bushing 30 into the opening portion 24a and bring the assembled lock member 26 to its FIG. 4 position within the main body portion 22. After the body portion 34 is driven to this position, the resilient detent member 28 (which is representatively of a nylon material) enters the square portion 24b of the body opening 24 as shown in FIG. 7.

Figure 6:
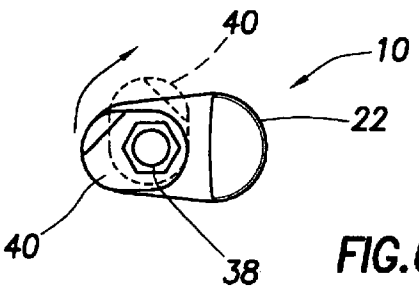
FIG. 6 is a reduced scale end elevational view of the connector pin assembly.
Figure 7:
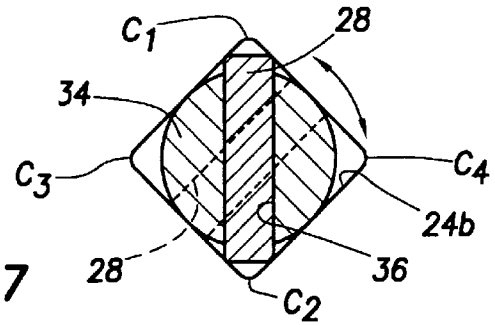
FIG. 7 is an enlarged scale partial interior cross-sectional view through the connector pin assembly taken along line 7—7 of FIG. 5.
Figure 3:
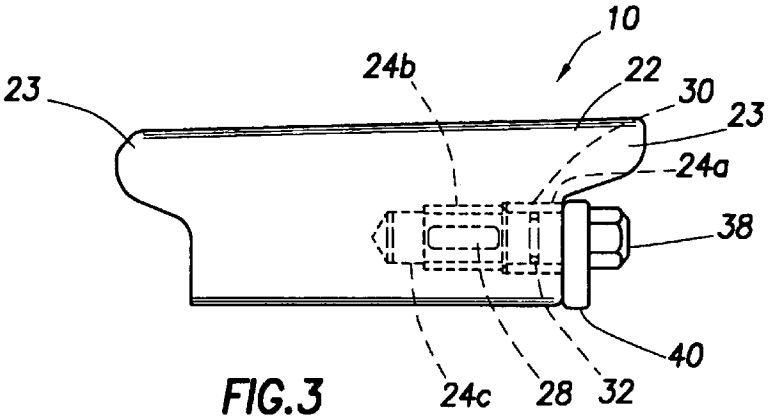
FIG. 3 is a reduced scale, partially phantomed side elevational view of the connector pin assembly.
Figure 5:
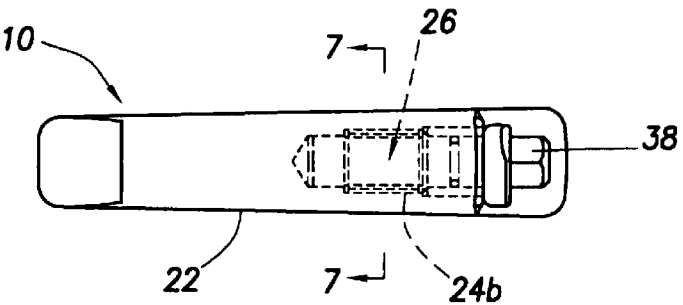
FIG. 5 is a reduced scale side edge elevational view of the connector pin assembly.
Figure 8:
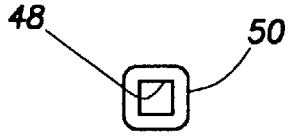
FIGS. 8 and 9, respectively, are end and side elevational views of a hollow, square cross-sectioned resilient detent member utilized in an alternate embodiment of the connector pin assembly.
Figure 9:
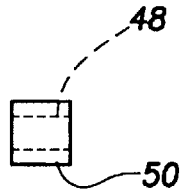
Figure 10:
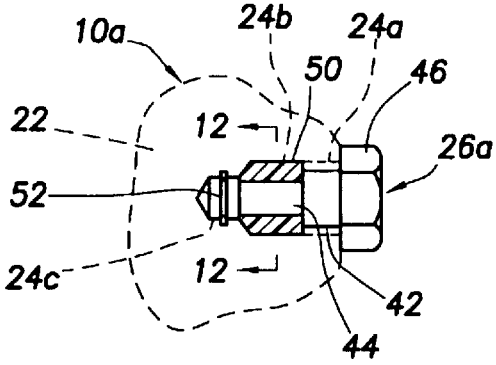
FIG. 10 is a simplified, somewhat schematic cross-sectional view, partially phantomed, through a lock member portion of the alternate connector pin assembly embodiment.
Figure 11:
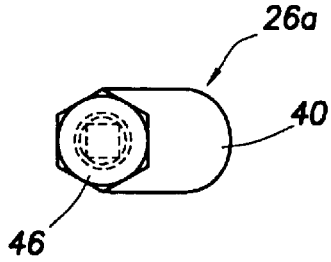
FIG. 11 is an end view of the lock member portion of the alternate connector pin assembly embodiment.
Figure 12:
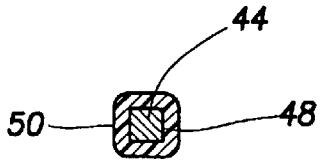
FIG. 12 is a cross-sectional view through the FIG. 11 lock member taken along line 12—12 of FIG. 10.

With the inserted lock member 26 in its solid line insertion/unlocking orientation shown in FIG. 6, the lobe 40 is disposed within the periphery of the main body portion 22, and opposite end portions of the detent member 28 are received in opposite corner portions C1,C2 of the square opening portion 24b (see FIG. 7). The completed connector pin assembly 10 is then inserted into the aligned point and adapter openings 18,20 as shown in FIG. 1 and the lock member 26 is rotated 90 degrees from its FIG. 6 solid line insertion/unlocking position to a retention/locking position in which the lobe 40 reaches its dotted line orientation in FIG. 6. In this position the lobe 40 extends outwardly beyond the periphery of the main body portion 22 and, as shown in FIG. 1, underlies a ledge 41 within the tooth point 12, thereby releasably locking the inserted connector pin assembly 10 within the aligned point/adapter openings 18,20 by blocking its longitudinal removal or dislodgement therefrom.

When the lock member 26 is rotated from its insertion/unlocking position to its retention/locking position, the opposite ends of the resilient detent member 28 are initially inwardly compressed against opposite side surfaces of the opening portion 24b (as indicated by the dotted line position of the detent member 28 in FIG. 7) and then snap outwardly into the opposite corner portions C3,C4 of the opening section 24b as the lock member 26 reaches its retention/locking position.

Since the resilient detent member 28 must be compressed during its rotational movement between the insertion and retention positions of the lock member 26, it resiliently resists undesired rotational movement of the lock member 26 from its retention/locking position to its insertion/unlocking position to thereby prevent accidental dislodgement of the inserted connector pin assembly 10 from the tooth point/adapter openings 18,20. The press-fitted bushing 30 overlies and outwardly blocks the opposite ends of the detent member 28 to thereby captively retain the lock member 26 within the opening 24 of the main body portion 22. The O-ring seal 32 disposed within the press-fitted bushing 30 functions to inhibit dirt and other debris from entering the interior of the connector assembly 10 inwardly past such seal.

AS can be seen, the interior opening or passage portion 24b within the main connector pin body portion 22 has a polygonal shape (representatively square) which circumscribes the inserted lock member 26. However, a variety of alternate polygonal and other non-circular shapes for this opening portion 24b could be utilized if desired.

An alternate embodiment 26a of the lock member 26 is shown in FIGS. 8–12 and is incorporated in an alternate embodiment 10a (see FIG. 10) of the previously described connector pin assembly 10 in turn, the illustrated connector pin assembly 10a is operatively installed in the previously described telescoped point 12 and adapter nose 14 in place of the previously described connector pin assembly 10 shown in FIG. 1. Lock member 26a has a cylindrical body portion 42 with a laterally inset square cross-sectioned central section 44. At the outer end of the body portion 42 is a hex head section 46 from which the retention lobe 40 outwardly projects.

Figure 13:
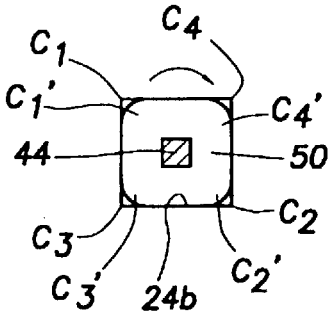
FIGS. 13 and 14, respectively, are schematic cross-sectional views through the FIG. 11 lock member in retention/locking and insertion/unlocking orientations thereof.
Figure 14:
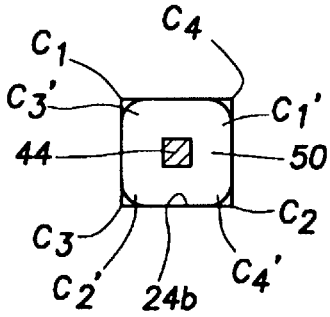

The square central section 44 is received in a corresponding square central opening 48 of a square rubber detent member 50 captively retained on the body portion 42 between facing ledges on the cylindrical portions of the body portion 42 disposed on opposite ends of its central square section 44. When the lock member 26a is driven into the opening 24 of the main body portion 22, the resilient detent member 50 enters the opening section 24b as shown in FIG. 13. Additionally, a snap ring 52 (see FIG. 10) carried on the inner end of the lock member body 42 is inwardly deformed and then snaps outwardly into a corresponding interior groove in the opening portion 24c to captively retain the inserted lock member 26a within the main connector pin body With the inserted lock member 26a in its FIG. 13 retention/locking position, the corners C1',C2',C3',C4' of the detent member 50 are respectively received in the corners C1,C2,C3,C4 of the square opening section 24b so that the detent member 50 is complementarily received in the opening portion 24b and resiliently resists rotation of the lock member 26a to its insertion/unlocking orientation shown in FIG. 14. Such resistance is provided due to the fact that to effect such rotation, each opposite pair of corner sections of the detent member must be compressed toward one another during such rotation. During such compression thereof the detent member 50 continues to fill the opening portion 24b. Accordingly, the detent member 50 (in all of its rotational orientations) also serves as a sealing element to inhibit the entry of dirt and other debris into the interior of the connector pin assembly 10a. Because of this, the previously described O-ring 32 may be omitted. When the lock member 26a is rotated to its FIG. 14 insertion/unlocking orientation, the resilient detent member 50 is again complementarily received within the interior opening portion 24b, with the detent member corner portions C1',C4',C2',C3' being respectively received in the corner portions C4,C2,C3,C1 of the opening section 24b.

As can be seen from the foregoing, each of the representatively illustrated and described connector pin assemblies 10 and 10a may be inserted into the telescoped point 12 and adapter nose 14 (or other types of telescoped members as the case may be) without the necessity of pounding the assembly into place. Moreover, the assemblies 10 and 10a are each of a simple construction, are easy to install and remove, and provide, via their unique locking member detent structures, for improved retention of the installed connector pin assemblies in the members which they releasably retain in a telescoped orientation.

The foregoing detailed description is to be clearly understood as being given by way of illustration and example only, the spirit and scope of the present invention being limited solely by the appended claims.

What is claimed is:

1. A connector pin assembly comprising:

a body having a passage longitudinally extending through an outer surface thereof and having a polygonally shaped side surface section extending completely around a longitudinal portion of the interior of said passage;

a lock member received in said passage and circumscribed by said side surface section, said lock member being rotatable relative to said body between locking and unlocking positions; and a resilient detent structure carried by said lock member for rotation therewith relative to said body and being circumscribed by said side surface section, said resilient detent structure being operative to releasably retain said lock member in either of said locking and unlocking positions and being slidingly engageable with and deformable by said side surface section, during rotation of said lock member relative to said body, in a manner yieldingly resisting rotation of said lock member relative to said body from said locking to said unlocking position.

2. The connector pin assembly of claim 1 wherein:

said resilient detent structure circumscribes said lock member.

3. The connector pin assembly of claim 2 wherein:

said resilient detent structure, when said lock member is in either of said locking and unlocking positions, is complementarily received in said polygonally shaped side surface section.

4. The connector pin assembly of claim 3 wherein:

said resilient detent structure has a square configuration.

5. The connector pin assembly of claim 1 wherein:

said polygonally shaped side surface section has a square shape.

6. The connector pin assembly of claim 1 wherein:

said lock member has a retaining member thereon which engages said body in a manner captively retaining said lock member in said passage.

7. The connector pin assembly of claim 6 wherein:

said retaining member is a snap ring received in an interior side surface groove of said passage.

8. The connector pin assembly of claim 1 wherein:

said body has an elongated shape with an exterior side surface that extends between opposite end portions of said body, outwardly circumscribes said passage, and is substantially parallel to the length of said body.

9. The connector pin assembly of claim 1 wherein:

said lock member has a generally cylindrical portion with an outer end from which a locking lobe transversely projects.

10. The connector pin assembly of claim 9 wherein:

said outer end has a noncircularly cross-sectioned rotational driving portion thereon.

11. The connector pin assembly of claim 10 wherein:

said rotational driving portion projects longitudinally outwardly from said locking lobe.

12. The connector pin assembly of claim 1 wherein:

said lock member has a slot extending therethrough and opening outwardly through opposite outer side portions thereof, and said resilient detent structure includes a resilient detent member extending through said slot and having opposite end portions projecting outwardly beyond said opposite outer side portions of said lock member and engaging circumferentially spaced apart portions of said polygonally shaped side surface section.

13. The connector pin assembly of claim 12 further comprising:

an annular bushing circumscribing a portion of said lock member and being press-fitted into said passage, said bushing captively retaining said resilient detent structure within said polygonally shaped side surface section.

14. The connector pin assembly of claim 13 further comprising:

an O-ring seal member carried by said lock member and sealingly engaging a circular interior side surface portion of said bushing.

15. The connector pin assembly of claim 1 wherein:

said connector pin assembly is configured to be operatively inserted into aligned openings in telescoped excavating wear and support members to captively retain them in a telescoped relationship.

16. A connector pin assembly comprising:

a body having a passage longitudinally extending inwardly through an outer surface thereof, said passage having a noncircularly shaped side surface section;

a lock member received in said passage and circumscribed by said side surface section, said lock member being rotatable relative to said body; and a resilient detent member carried by said lock member for rotation therewith *relative to said body* and having a periphery circumscribing said lock member, said periphery complementarily and slidably engaging said noncircularly shaped side surface section,

*said connector pin assembly being configured to be operatively inserted into aligned openings in telescoped excavating wear and support members to captively retain them in a telescoped relationship.*

17. The connector pin assembly of claim 16 wherein:

said side surface section has a polygonal shape.

18. The connector pin assembly of claim 17 wherein:

said polygonal shape is a square shape.

19. The connector pin assembly of claim 16 wherein:

said body has an elongated shape with an exterior side surface that extends between opposite end portions of said body, outwardly circumscribes said passage, and is substantially parallel to the length of said body.

[20. The connector pin assembly of claim 16 wherein:

said connector pin assembly is configured to be operatively inserted into aligned openings in telescoped excavating wear and support members to captively retain them in a telescoped relationship.]

21. A connector pin assembly comprising:

a body having a passage longitudinally extending inwardly through an outer surface thereof, said passage having a noncircularly shaped side surface section;

a lock member received in said passage and circumscribed by said side surface section, said lock member being rotatable relative to said body and having a slot extending therethrough and opening outwardly through opposite outer side surface portions of said lock member; and a resilient detent member extending through said slot and having opposite end portions projecting outwardly beyond said outer side surface portions and slidably engaging said noncircularly shaped side surface section of said passage.

22. The connector pin assembly of claim 21 wherein: said side surface section has a polygonal shape.

23. The connector pin assembly of claim 22 wherein:

said polygonal shape is a square shape.

24. The connector pin assembly of claim 21 wherein:

said body has an elongated shape with an exterior side surface that extends between opposite end portions of said body, outwardly circumscribes said passage, and is substantially parallel to the length of said body.

25. The connector pin assembly of claim 21 wherein:

said connector pin assembly is configured to be operatively inserted into aligned openings in telescoped excavating wear and support members to captively retain them in a telescoped relationship.

26. A connector pin assembly and associated apparatus comprising:

first and second telescoped members having aligned connector openings therein; and a connector pin assembly captively retaining said first and second members in a telescoped relationship, said connector pin assembly including:

a body removably received in said aligned connector openings and blocking separation of said first and second members from one another, said body having a passage extending inwardly through an outer surface thereof, said passage having a noncircularly shaped side surface section, a lock member received in said passage and circumscribed by said side surface section, said lock member being rotatable relative to said body between a locking position in which said lock member blocks removal of said body from said connector openings, and an unlocking position in which said lock member permits removal of said body from said connector openings, and a resilient detent member carried by said lock member for rotation therewith *relative to said body* and being operative to releasably retain said lock member in said locking position, said detent member having a periphery circumscribing said lock member, said periphery complementarily and slidably engaging said noncircularly shaped side surface section.

27. The connector pin assembly and associated apparatus of claim 26 wherein:

said first member is an excavating support member, and said second member is an excavating wear member.

28. The connector pin assembly and associated apparatus of claim 27 wherein:

said excavating support member is an adapter, and said excavating wear member is a tooth point.

29. The connector pin assembly and associated apparatus of claim 26 wherein:

said side surface section has a polygonal shape.

30. The connector pin assembly and associated apparatus of claim 29 wherein:

said polygonal shape is a square shape.

31. The connector pin assembly and associated apparatus of claim 26 wherein:

said body has an elongated shape with an exterior said surface that extends between opposite end portions of said body, outwardly circumscribes said passage, and is substantially parallel to the length of said body.

32. A connector pin assembly and associated apparatus comprising:

first and second telescoped members having aligned connector openings therein; and a connector pin assembly captively retaining said first and second members in a telescoped relationship, said connector pin assembly including:

a body removably received in said aligned connector openings and blocking separation of said first and second members from one another, said body having a passage extending inwardly through an outer surface thereof, said passage having a noncircularly shaped side surface section, a lock member received in said passage and circumscribed by said side surface section, said lock member having a slot extending therethrough and opening outwardly through opposite outer side surface portions of said lock member, said lock member being rotatable relative to said body between a locking position in which said lock member blocks removal of said body from said connector openings, and an unlocking position in which said lock member permits removal of said body from said connector openings, and a resilient detent member carried by said lock member for rotation therewith and being operative to releasably retain said lock member in said locking position, said detent member extending through said slot and having opposite end portions projecting outwardly beyond said outer side surface portions and slidably engaging said noncircularly shaped side surface section of said passage.

33. The connector pin assembly and associated apparatus of claim 32 wherein:

said first member is an excavating support member, and said second member is an excavating wear member.

34. The connector pin assembly and associated apparatus of claim 33 wherein:

said excavating support member is an adapter, and said excavating wear member is a tooth point.

35. The connector pin assembly and associated apparatus of claim 32 wherein:

said side surface section has a polygonal shape.

36. The connector pin assembly and associated apparatus of claim 35 wherein:

said polygonal shape is a square shape.

37. The connector pin assembly and associated apparatus of claim 36 wherein:

said body has an elongated shape with an exterior said surface that extends between opposite end portions of said body, outwardly circumscribes said passage, and is substantially parallel to the length of said body.

* * * * *